Figure 1:
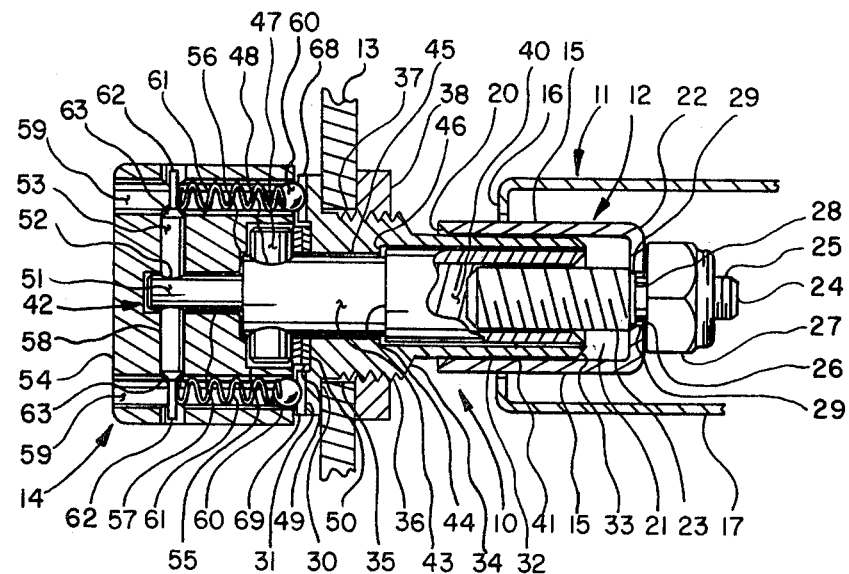

United States Patent

[11] 3,603,660

[72] Inventor Marvin D. Weltha
       Marion, Iowa
[21] Appl. No. 37,608
[22] Filed May 15, 1970
[45] Patented Sept. 7, 1971
[73] Assignee Collins Radio Company
       Cedar Rapids, Iowa

[54] BOX HOLDDOWN DEVICE
     17 Claims, 5 Drawing Figs.
[52] U.S. Cl. .................................... 312/333
[51] Int. Cl. ................................. A47b 88/00,
                                              A47b 95/00
[50] Field of Search .......................... 312/320,
                                              333, 215

[56] References Cited
     UNITED STATES PATENTS
2,877,637  3/1959  Greenwald .................. 312/333 X
3,050,358  8/1962  Unterhost .................... 312/333
3,199,938  8/1965  Vook ........................... 312/333

Primary Examiner—Paul R. Gilliam
Attorneys—Warren H. Kintzinger and Robert J. Crawford ABSTRACT: A turn detent lock holddown device for insertion and extraction forcing and guidance of equipment boxes on electronic racks with a fast lead screw and guided dowelling between box and rack mounted device portions and with a ball detent lock for static box in place locking. Further, with a two holddown device equipped box dowell restrainment through one holddown device in all lateral directions and dowell restrainment through the other holddown device only from movement laterally back and forth in the direction that would otherwise permit rotational movement of the box about the longitudinal axis of the device with dowell restrainment in all lateral directions.

PATENTED SEP 7 1971

3,603,660

SHEET 1 OF 3

INVENTOR
MARVIN D. WELTHA
BY Warren H. Kintzinger
ATTORNEY

INVENTOR
MARVIN D. WELTHA
BY Warren H. Kintzinger
ATTORNEY

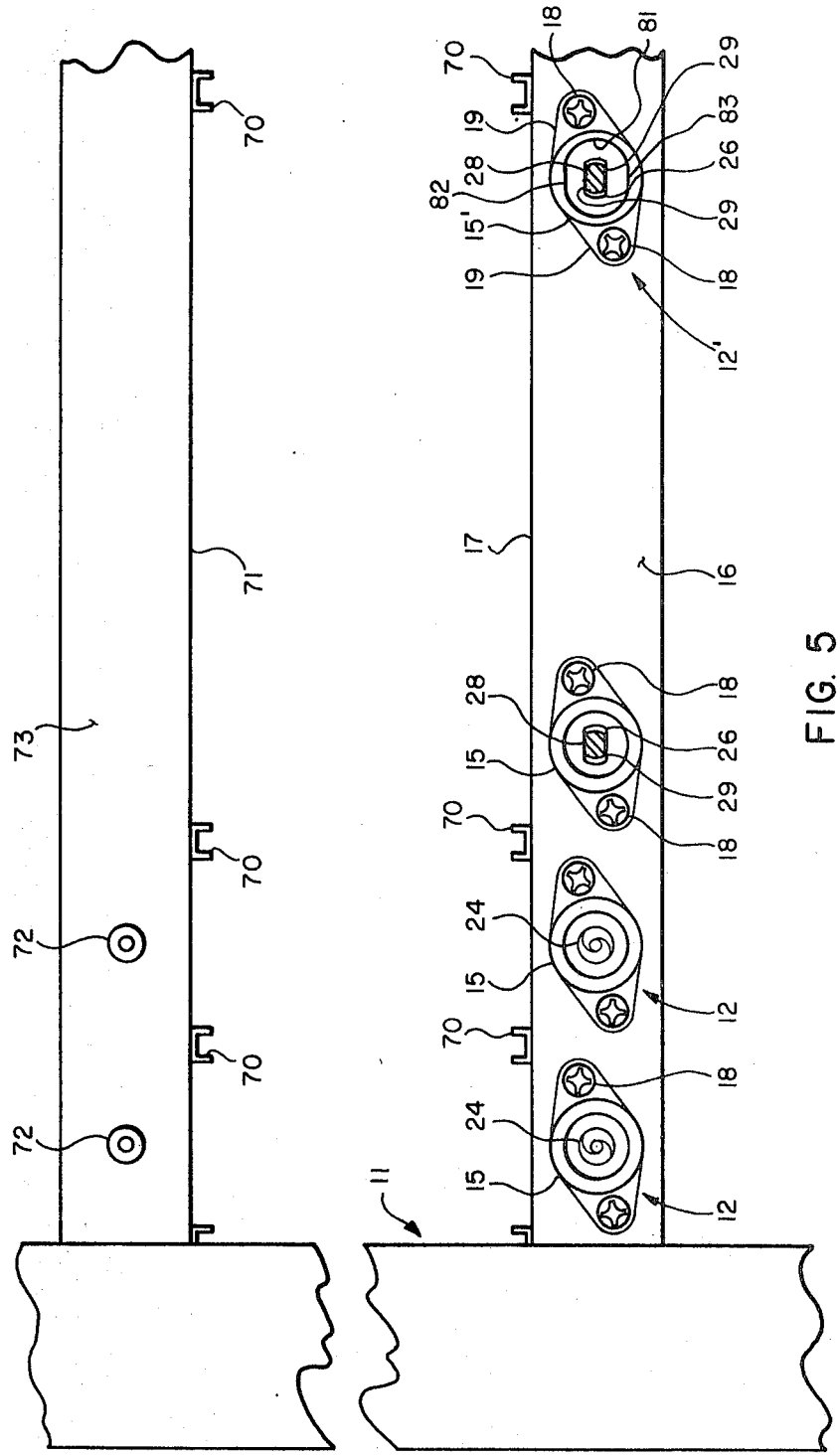

BOX HOLDDOWN DEVICE

This invention relates in general to equipment box on rack mounting holddown devices, and in particular, to a detent locked equipment holddown injection and extraction device.

In many installations it is important to mount electrical equipment boxes or modules in equipment racks in a dependable self-locking manner. This is particularly significant in environments subject to both vibration and high acceleration forces such as encountered many times in aircraft installations. A finger-actuated, self-locking, quick and relatively simple insertion and extraction holddown device with relatively low internal friction forces both in insertion and extraction of boxes would be very useful particularly if such devices were also provided with a sure lock feature. Further, it is important that boxes receive locating and dowelling guidance to insure proper mating of connections being engaged and disengaged in the insertion and extraction of boxes to an equipment rack with such holddown devices.

It is, therefore, a principal object of this invention to provide an equipment box to mounting rack fast acting insertion and extraction holddown device of relatively small size that while finger actuated provides positive lock as box and rack connector elements come into the fully engaged state.

Another object with such holddown devices is to provide ball detent locking and a fast lead thread for fast box insertion and extraction multirepeated cycles without damaging wear.

A further object with such holddown devices is to provide, with boxes using two of the holddown devices, a first holddown device with a dowell member to rack mounted housing fit restricting relative lateral movement in all directions, and the second of the devices with a dowell member to rack mounted housing fit closely restricting relative lateral movement only with respect to movement in a rotational sense about the center axis of the first of the holddown devices.

Features of this invention useful in accomplishing the above objects include, in a box to equipment rack holddown system, manually operated holddown fast acting box insertion and extract devices with fast lead screws and ball detent self-locking as the boxes are brought into a fully inserted state. The holddown devices when used singly with a relatively thin box, and when two are used with a wider box one thereof, employ a dowell member to rack mounted housing fit restricting relative lateral movement therebetween in all radial directions, and with the other holddown device where two are employed for one box a dowell member to rack mounted housing fit closely restricting relative lateral movement only with respect to that which would otherwise permit the box to rotate about the center axis of the other holddown device. Further, the ball detent self-lock structure of each holddown device employs two balls resiliently urged into engagement with an annular locking tooth equipped detent collar with teeth more steeply sloped on the locking side than the entrance side and with tooth spacing such that at least one ball is riding on a tooth surface in any relative rotational position between the ball mounting knob member and the toothed detent collar.

A specific system embodiment representing what is presently regarded as the best mode of carrying out the invention is illustrated in the accompanying drawings.

Figure 2:
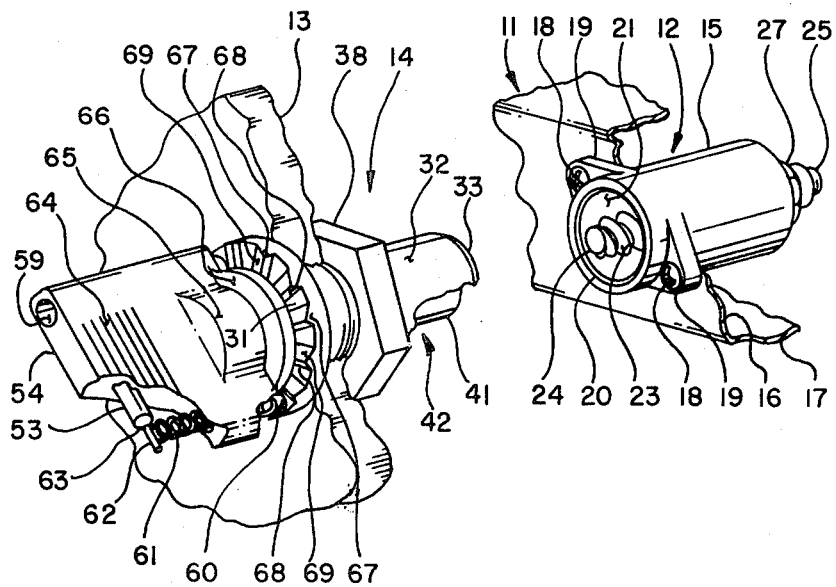
Figure 3:
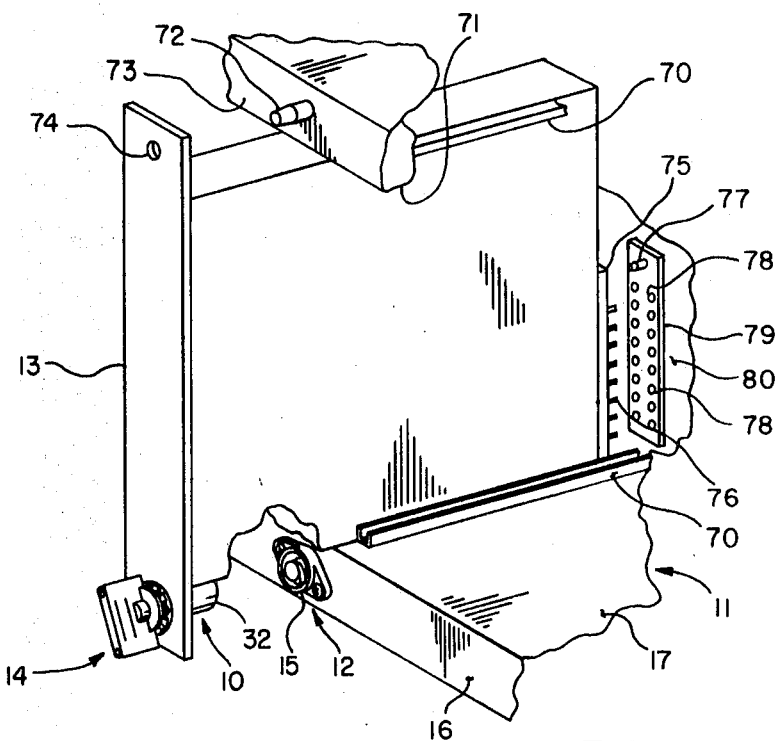
Figure 4:
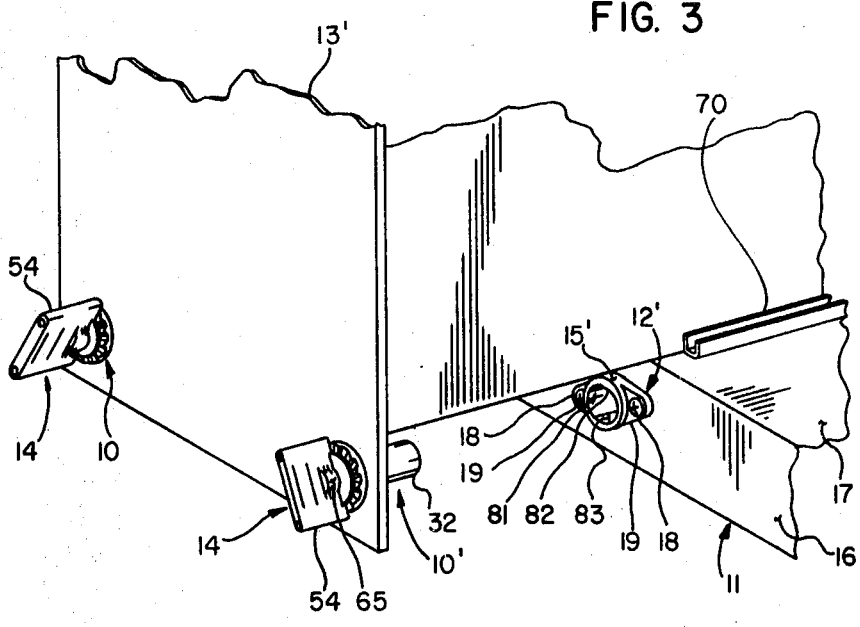

In the drawings:

FIG. 1 represents a side elevation partially cut away and sectioned detail view of one of applicants holddown devices with a dowell housing mounted on an equipment rack and mating structure on a box;

FIG. 2 a partially broken away perspective view showing more detail of both the rack mounted portion and the box mounted portion of a holddown device;

FIG. 3 a more general perspective view of a relatively narrow box as it would fit in an equipment rack in a partially inserted state and the relation of a single holddown device used therewith;

FIG. 4, a partial general perspective view of a wider box such as would also be used in the equipment rack of FIG. 3 with rack mounted dowell housing member detail differences shown for the second holddown device in a two holddown device equipped box; and, FIG. 5 a partial view of an equipment rack showing holddown device rack mounted portion detail for two narrow one holddown device boxes and one two device box.

The holddown device 10 of FIG. 1 includes an equipment racket 11 mounted portion 12 and a box 13 mounted portion 14. The rack 11 mounted portion 12 includes a tubular housing member 15 mounted on the forward facing wall 16 of a box 13 supporting shelf 17 by, as shown in FIG. 2, threaded screws (or bolts) 18 through housing mounting ears 19 and the wall 16. Housing 15 includes an annular inwardly bevelled entrance guide surface 20 at the outer end extending to dowell mating and receiving inner annular tube surface 21 that extends to the housing 15 inner end wall 22. Fast lead thread 23 equipped screw 24 is mounted to project forwardly from tubular housing inner end wall 22 by a threaded extension 25 passed through opening 26 in inner end wall 22 with a lock nut 27 thereon. Referring also to FIG. 5, please note that a flat-sided shank 28 of extension 25 is so confined within opposite paralleled flat sides 29 of opening 26, with the extension 25 passed therethrough, as to prevent relative rotation of the screw 25.

The box 13 mounted portion 14 includes a combination outer collar 30 with an outwardly facing annular detent toothed face 31 and an inwardly extended tubular dowell extension 32 with the outer dowell surface thereof designed to be a relatively close dowelled fit within the inner annular tube surface 21 of housing 15 so as to limit lateral relative movement therebetween in all directions. The inner end of the dowell extension 32 is provided with an annular bevelled surface 33 that interacts with the bevelled entrance guide surface 20 of housing 15 to facilitate mating engagement in entrance of the dowell member to insert dowell relation with the housing member 15. The combination collar and dowell member 34 is provided with a shoulder 35 and then a threaded portion 36, between collar 30 and the tubular dowell extension 32, extended through opening 37 of the box 13 in order that the holddown device portion 14 may be mounted in place on the box 13 by a nut 38 tightened on the threads 36 of the combination collar and dowell member 34. The combination collar and dowell member 34 of holddown device portion 14 is provided with an elongate cylindrical opening 39 for receiving the internally threaded 40 portion 41 of sleeve member 42. The sleeve member 42 is provided with a longitudinal extension 43 that extends from thrust shoulder face 44 through a reduced diameter opening 45 from internal thrust reaction shoulder face 46 of the combination collar and dowell member 34 to a thrust pin 47 inserted through an opening 48 provided therethrough to engage thrust washers 49 contained within annular recess 50 of the combination collar and dowell member 34 between the thrust pin 47 and the member 34. Extension 43 of internally threaded sleeve member 42 is also provided with a further outward extension 51 with an opening 52 through which spring retaining pin 53 is inserted. Please note, that the thrust shoulder face 44 of sleeve member 42 and the internal thrust reaction shoulder face 46 of the combination collar and dowell member 34 interact to take up thrust forces during the extract mode of operation of the holddown device in extraction of the box 13 from equipment rack 11.

A manually actuated knob 54 is provided for the holddown device 10 that is equipped with an opening 55 receiving thrust pin 47, opening 56 receiving the end of extension 43 of sleeve member 42, smaller diameter opening 57 receiving the outward extension 51 of sleeve member 42, and a transversely extended opening 58 that contains spring retaining pin 53. Longitudinally extended openings 59 are also provided in knob 54, within the lateral extremities thereof in longitudinal alignment with outwardly facing annular detent toothed face 31 of collar 30, for detent balls 60 and detent ball springs 61. These are, by sets together confined between spring retaining pin 53 and the detent toothed face 31 in order that the detent balls 60 may be continuously resiliently urged into detent-acting engagement therewith. It is interesting to note that spring retaining pin 53 not only retains the springs 61 at the outer ends thereof with reduced diameter opposite pin end projections 62, but that the pin 53 itself is restrained in inserted relation by engagement of the outer ends of springs 61 with pin bevel surfaces 63. Thus, the spring retaining pin 53 that also acts as a mounting member holding knob 58 in position on the outer end of sleeve member 42 is maintained in its proper assembled state without requiring any screws or other fastening paraphernalia in the knob assembly. Knob 54 is conveniently formed as a relatively thin flat knob with finger grasping serrations 64 on opposite sides thereof, with a boss 65 on opposite sides to accommodate the internal opening 56 receiving extension 43 of sleeve member 42, and a bottom disc portion 66 partially overlying the annular detent toothed face 31. A significant feature of the annular detent toothed face 31 is that each of the teeth 67 thereof are formed with different slopes, a more steep slope 68 on the locking sides, and a more shallow slope 69 opposing knob and ball 61 rotation in the insert direction with the holddown device 10. Furthermore, the annular detent toothed face 31 is constructed with such a number of teeth, and such tooth 67 spacing that at least one of the two detent balls 60 is riding on a toothed surface 68 or 69 at any one instant of time. Then, when knob 54 is not being manually turned, the knob assumes a stable detent maintained rotational state with one detent ball 60 riding on a shallow tooth slope 69, thereby rotationally urging, via the knob assembly 54, the other detent ball 60 over into side engagement with, but not up, a more steep tooth slope 68. With rotational forces exerted on knob 54 actually moving a detent ball 60 up a steep detent locking slope 68, the other ball 60 leaves a shallow tooth slope 69 with, as a result, maximum detent lock position restraining torque being exerted by a steep slope 68 on a ball 60.

Referring also to FIG. 3, a single holddown device 10, such as that of FIGS. 1 and 2 is used with a relatively narrow equipment box 13 that receives some guidance and support for insertion and extraction movement from the equipment rack 11 by duplicate guide rails 70 on both lower supporting shelf 17 and rack upper shelf 71. Each of the relatively narrow equipment boxes 13 is equipped for engagement with an upper guide pin 72 mounted on forward face 73 of the upper rack shelf 71 with the pin 72 giving guiding registration and support in cooperation with a guide opening 74 in the box 13. Please note that many equipment boxes are provided with rear connector box structures 75 equipped with male connector pins 76 that are brought into alignment registry via box engagement with guide pin 77 and ultimately guided connective insertion of male pins 76 with mating connector elements 78 of a connector structure 79 mounted on equipment rack rear wall 80. Obviously, the connector pins 76 could be interchanged with the connector elements 78 in being on one or the other of box 13 or the rear rack wall 80. As a box 13 is being inserted into rack 11, the box-mounted portion 14 of holddown device 10 is brought into contact with rack mounted portion 12 of the holddown device 10 with fast lead thread 23 and the internal threaded 40 portion 41 of sleeve member 42 cooperatively designed for easy entrance of the fast lead thread 23 equipped screw 24 therein. In accomplishing this, there is a limited degree of permissible lateral float of the internally threaded sleeve member 42 in the holddown device portion 14 and limited lateral float of the fast lead screw 24 in its mounting in the rack mounted portion 12 along with advantageously a relatively loose screw fit between the threads of screw 24 and the internal threads of sleeve member 41. The cumulative lateral float permitted with these respective thread engaging members advantageously permits the dowell receiving internal tube surface 21 and the tubular dowell extension 32 to be the dowell position controlling components in equipment box insertion and extraction with holddown device 10.

Referring now also to FIGS. 4 and 5, it is of significant interest to note that there is an important modification in the rack 11 mounted holddown device 10' portion 12' while the other holddown device 10, in a two holddown device equipped box 13', is the same as that of FIGS. 1, 2 and 3. This significant difference is in the tubular housing member 15' wherein the inner opening 81 thereof, instead of being an inner annular tube surface 21 for dowell mating with tubular dowell extension 32 for lateral restrainment thereof in all radial directions, is an elongated opening with parallel upper and lower flat surfaces 82 and 83. Thus, this housing 15' configuration in the holddown device 10' structure cooperatively with the holddown device 10 in a two holddown device equipped box 13' is so oriented as to permit limited nonbinding movement of dowell extension 32 of portion 14 in the holddown device structure 10' toward and/or away from the other holddown device 10 while restraining the dowell extension 32 of holddown device 10' from up and down movement and the box 13' from, in effect, rotational movement about the effective dowell center axis of the other holddown device 10. Please note further, that with two holddown device equipped boxes 13' use of guide pins on the forward face 73 of upper shelf 71, such as guide pins 72 used with narrow one holddown device 10 equipped boxes 13, are dispensed with in order that the two holddown devices 10 and 10' with a wider box 13' provide major insert and extract and alignment control.

Thus, there is hereby provided a turn detent lock holddown device designed for finger actuation that is self-detent locking in various insertion and extraction positions for the holddown device fasteners and electronic equipment boxes mounted therewith in electronic equipment racking systems. Quick, simple insertion and extraction of the electronic equipment boxes is provided with the fast lead threads used therewith. With turn detent lock holddown devices built in accord with the teachings hereinbefore set forth, approximately 90 lbs., axial force is developed with a comfortable 9-inch lbs. of torque manually applied to the knob with the fingers. Maximum insertion force attainable with manual finger actuation, as the final fully inserted and detent locked position is reached, is about 150 lbs., and in the fully inserted position the turn detent lock holddown device will withstand an axial static load of approximately 1,000 lbs. and also lateral static loading approximating 500 lbs. Thrush washers and the fast lead thread construction minimize internal friction losses within the turn detent lock holddown device with as a result most of the manual energy applied to the finger knob being transformed into useful forces for insertion, extraction, or static holddown fastening of electronic boxes to the equipment rack. With a holddown structure that has been built and presently employed, the screw threads engage and are active in the insertion mode through approximately 0.300 inches with this range of movement also being the extraction range. This is with a rated load range and recommended home range of approximately 0.200 inches, and with the o.300-inch insert and extract range requiring approximately 2.4 turns of the knob 54. Please note that with the holddown device used and blind engaging of electrical connectors at the back of a box and rack, the screw and sleeve of a holddown device may be so proportioned that no force is applied in the insert mode until after the connector indexing pins have been properly engaged. Attention is drawn again to what may be called double D holes provided in the female dowell housing used in the rack mounted portion 12' of a holddown device 10' of a wider box 13' equipped also with an additional holddown device 10 in order to restrict travel therewith only in a rotational sense about the axis of the other holddown device 10.

Whereas this invention is here illustrated and described with respect primarily to a single embodiment thereof, it should be realized that various changes may be made without departing from the essential contributions to the art made by the teachings hereof.

I claim:

1. In a detent lock equipment box to rack insert and extract and holddown device: a first portion adapted for being mounted on a rack; a second portion adapted for being mounted on an equipment box; a female dowell member with a dowell opening mounted in one of said first and second portions, and a male dowell member mounted in the other of said first and second portions; a male threaded member mounted in one of said first and second portions, and a female threaded member mounted in the other of said first and second portions with means mounting the dowell member and threaded member of said first portion in a nonrotative state; the threaded member of said second portion being mounted for rotation relative to rotationally fixed components of the second portion and to the equipment box during insert and extract operation of the device; a manually actuated rotational knob connected to the rotationally mounted threaded member in said second portion; and detent means having a toothed face first portion engaged by a plurality of detent riding means of a second portion urged into continuous toothed face engagement by resiliently compressible means with one of said detent means portions on nonrotative means of said second portion of said holddown device, and the other of said detent means portions on rotative means of said second portion of said holddown device.

2. The holddown device of claim 1 wherein, at least one of said male and female threaded members is mounted with limited lateral float.

3. The holddown device of claim 2 wherein, the female dowell member with a dowell opening is mounted in said first portion that mounts on a rack; and said male threaded member is mounted with a threaded portion extended longitudinally along, within and, generally, in concentric relation with the dowell opening of said female dowell member.

4. The holddown device of claim 3 wherein, threads of said male threaded member and said female threaded member are mating fast high lead threads with relatively loose play tolerance therebetween combined with lateral float of at least one of said male and female threaded members to provide easy fast insert and extraction operation with the threaded members readily adapting to the guided locating action of said dowell members without bind during insert and extract.

5. The holddown device of claim 4 wherein, said male dowell member and said female dowell member are a mating fit when engaged in the insert, extract, and in the inserted holddown detent locked state limiting relative lateral movement to close tolerances therebetween in all directions.

6. The holddown device of claim 4 wherein, said male dowell member and said female dowell member are a mating fit when engaged in the insert, extract, and in the inserted holddown detent locked state closely limiting relative lateral movement to close tolerances therebetween back and forth in only one path.

7. The holddown device of claim 4 wherein, with a box using two holddown devices the male and female dowell member mating fit of a first holddown device limits relative lateral movement to close tolerances therebetween in all directions; the male and female dowell member mating fit of the second holddown device limits relative lateral movement to close tolerances therebetween back and forth substantially along one path; and with said second holddown device mounted for the path of limited relative lateral movement being oriented to substantially prevent relative rotative movement of the box about the longitudinal axis of said first holddown device.

8. The holddown device of claim 1 wherein, said detent means includes an annular toothed face first portion; with said plurality of detent riding means being two detent balls; and with said resiliently compressible means being individual spring means resiliently backing each of said detent balls.

9. The holddown device of claim 8 wherein, said detent means annular toothed face portion is nonrotatably fixed in place in said second portion of a holddown device adapted for being mounted on an equipment box; said detent balls and said individual spring means are mounted for movement with said second portion of said detent means as the manually actuated rotational knob is turned.

10. The holddown device of claim 9 wherein, said knob forms part of said second portion of said detent means with said individual springs and the detent balls mounted in knob openings positioned for detent riding movement of said detent balls over said annular toothed face.

11. The holddown device of claim 10 wherein, said knob is mounted on an extension of one of said threaded members by a mounting pin.

12. The holddown device of claim 11 wherein, said mounting pin includes pin end extensions retaining said individual springs in said knob openings.

13. The holddown device of claim 12 wherein, bevelled surfaces are provided with said pin end extensions on said mounting pin with said mounting pin restrained in inserted assembled position by individual spring outer ends engaging said bevelled surfaces.

14. The holddown device of claim 9 wherein, insert thrust force reactive means is provided in said second portion of a holddown device.

15. The holddown device of claim 14 wherein, extract thrust force shoulder means is provided in said second portion of a holddown device.

16. The holddown device of claim 9 wherein, individual teeth of said annular toothed face first portion are each provided with a relatively shallow slope on the holddown device insert detent direction, and a relatively steep slope on the holddown device inserted detent position lock sides.

17. The holddown device of claim 16 wherein, tooth positioning and spacing provide that at least one of said detent balls is riding on a tooth surface in all relative positions of the first and second portions of said detent means.